(12) United States Patent
Ishii

(10) Patent No.: US 10,503,560 B2
(45) Date of Patent: Dec. 10, 2019

(54) DISTRIBUTED PROCESSING CONTROL DEVICE

(71) Applicant: NEC Corporation, Minato-ku, Tokyo (JP)

(72) Inventor: Takamitsu Ishii, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/057,304

(22) Filed: Mar. 1, 2016

(65) Prior Publication Data

US 2016/0274954 A1 Sep. 22, 2016

(30) Foreign Application Priority Data

Mar. 16, 2015 (JP) ................................. 2015-052264

(51) Int. Cl.
*G06F 9/50* (2006.01)

(52) U.S. Cl.
CPC ................. *G06F 9/5066* (2013.01)

(58) Field of Classification Search
None
See application file for complete search history.

(56) References Cited

U.S. PATENT DOCUMENTS

| | | | | |
|---|---|---|---|---|
| 2010/0205075 A1* | 8/2010 | Zhang | .................... | G06Q 10/04 705/30 |
| 2011/0041136 A1* | 2/2011 | Messier | ................ | G06F 9/5066 718/105 |
| 2012/0084788 A1 | 4/2012 | Sakamoto | | |
| 2013/0219394 A1* | 8/2013 | Goldman | .............. | G06F 9/5066 718/100 |
| 2013/0326535 A1* | 12/2013 | Matsuda | ................... | G06F 9/50 718/104 |
| 2014/0201753 A1* | 7/2014 | He | ........................ | G06F 9/4881 718/104 |
| 2014/0215477 A1* | 7/2014 | Chen | ..................... | G06F 9/5066 718/102 |
| 2014/0358977 A1* | 12/2014 | Cramer | ............. | G06F 17/30203 707/827 |

FOREIGN PATENT DOCUMENTS

| | | |
|---|---|---|
| JP | 2005-310120 A | 11/2005 |
| JP | 2010-218307 A | 9/2010 |
| JP | 2012-079242 A | 4/2012 |
| JP | 2012-160014 A | 8/2012 |
| JP | 2014-515521 A | 6/2014 |

OTHER PUBLICATIONS

Japanese Office Action for JP Application No. 2015-052264 dated Sep. 25, 2018 with English Translation.

* cited by examiner

*Primary Examiner* — Sisley N Kim

(57) ABSTRACT

A distributed processing control device includes a process accepting unit that accepts processes, a relevance acquisition unit that acquires relevance between the processes accepted by the process accepting unit; and a distributed processing instruction unit that distributively instructs a plurality of processing nodes to execute the processes accepted by the process accepting unit, based on the relevance between the processes acquired by the relevance acquisition unit.

10 Claims, 10 Drawing Sheets

Fig.5

| | JOB NAME | ANALYSIS OF USERS WHO PURCHASED A PRODUCT |
|---|---|---|

| | | PROCESS NAME | PROCESS ATTRIBUTE |
|---|---|---|---|
| PROCESS 1 | | ACQUISITION OF SALES DETAIL DATA | DATA ACQUISITION (SALES DETAILS) |
| PROCESS 2 | | ACQUISITION OF PURCHASER DATA | DATA ACQUISITION (PURCHASERS) |
| PROCESS 3 | | TABULATION OF PURCHASE TIME | MAP PROCESS (PURCHASE DATE) |
| PROCESS 4 | | TABULATION OF GENERATIONS | MAP PROCESS (AGE OF PURCHASERS) |
| PROCESS 5 | | TABULATION OF MALES/FEMALES | MAP PROCESS (SEX OF PURCHASERS) |

Fig.6

| SALES DETAIL ID | PRODUCT ID | PURCHASE DATE | AGE OF PURCHASER | SEX OF PURCHASER |
|---|---|---|---|---|
| 000001 | A00001 | 2015/1/10 | 27 | MALE |
| 000002 | A00003 | 2014/12/1 | 41 | FEMALE |
| 000003 | A00005 | 2014/8/22 | 33 | MALE |
| 000004 | A00006 | 2014/11/5 | 18 | MALE |
| 000005 | A00007 | 2014/12/30 | 20 | FEMALE |

Fig.7

| | JOB NAME | WORD COUNT |
|---|---|---|

| | | PROCESS NAME | PROCESS ATTRIBUTE |
|---|---|---|---|
| PROCESS 1 | | ACQUISITION OF DOCUMENT DATA | DATA ACQUISITION (DOCUMENT) |
| PROCESS 2 | | TABULATION OF WORDS | MAP PROCESS (WORDS) |

Fig.8

|  | TABULATION OF PURCHASE TIME | TABULATION OF GENERATIONS | TABULATION OF MALES/ FEMALES | TABULATION OF WORDS |
|---|---|---|---|---|
| TABULATION OF PURCHASE TIME | 1 | 0.5 | 0.5 | 0.01 |
| TABULATION OF GENERATIONS | 0.5 | 1 | 0.7 | 0.01 |
| TABULATION OF MALES/ FEMALES | 0.5 | 0.7 | 1 | 0.01 |
| TABULATION OF WORDS | 0.01 | 0.01 | 0.01 | 1 |

Fig.9

|  | TABULATION OF PURCHASE TIME | TABULATION OF GENERATIONS | TABULATION OF MALES/ FEMALES | TABULATION OF PURCHASE TIME+WORDS |
|---|---|---|---|---|
| TABULATION OF PURCHASE TIME | 1 | 0.5 | 0.5 | 1 |
| TABULATION OF GENERATIONS | 0.5 | 1 | 0.7 | 0.51 |
| TABULATION OF MALES/ FEMALES | 0.5 | 0.7 | 1 | 0.51 |
| TABULATION OF PURCHASE TIME−WORDS | 1 | 0.51 | 0.51 | 1 |

Fig.10

| ELEMENTS | VALUE | TYPE |
|---|---|---|
| ~TEENS | $0 \leq x \leq 19$ | Integer |
| 20S | $20 \leq x \leq 29$ | Integer |
| 30S | $30 \leq x \leq 39$ | Integer |
| 40S | $40 \leq x \leq 49$ | Integer |
| 50S | $50 \leq x \leq 59$ | Integer |
| 60S~ | $60 \leq x$ | Integer |

| ELEMENTS | VALUE | TYPE |
|---|---|---|
| DATE | — | Date |

| ELEMENTS | VALUE | TYPE |
|---|---|---|
| MALE | MALE | String |
| FEMALE | FEMALE | String |

Fig.11

|  | TABULATION OF PURCHASE TIME | TABULATION OF GENERATIONS (~TEENS, 20S, 30S) | TABULATION OF GENERATIONS (40S, 50S, 60S~) | TABULATION OF MALES/FEMALES | TABULATION OF WORDS |
|---|---|---|---|---|---|
| TABULATION OF PURCHASE TIME | 1 | 0.4 | 0.4 | 0.4 | 0.01 |
| TABULATION OF GENERATIONS (~TEENS, 20S, 30S) | 0.4 | 1 | 1 | 0.6 | 0.01 |
| TABULATION OF GENERATIONS (40S, 50S, 60S~) | 0.4 | 1 | 1 | 0.6 | 0.01 |
| TABULATION OF MALES/FEMALES | 0.4 | 0.6 | 0.6 | 1 | 0.01 |
| TABULATION OF WORDS | 0.01 | 0.01 | 0.01 | 0.01 | 1 |

DISTRIBUTED PROCESSING CONTROL DEVICE

INCORPORATION BY REFERENCE

The present invention is based upon and claims the benefit of priority from Japanese patent application No. 2015-052264, filed on Mar. 16, 2015, the disclosure of which is incorporated herein in its entirety by reference.

TECHNICAL FIELD

The present invention relates to a distributed processing control device, distributed processing control method, and a program.

BACKGROUND ART

As a technology for analyzing and processing large-scale data, parallel distributed processing has been known, in which data processing is performed distributively by a plurality of nodes.

For example, JP 2010-218307 A (Patent Document 1) describes a distributed calculation control system including a job control unit having a job arrangement processing unit. According to Patent Document 1, the job arrangement processing unit obtains a flow graph of calculation processing and a set of virtual machines available at that time. Then, the job arrangement processing unit obtains a set of arrangement patterns in which respective elements of the flow graph are arranged at random to virtual machines belonging to the set of virtual machines. Then, the job arrangement processing unit calculates the costs of respective arrangement patterns constituting the set of arrangement patterns, and selects an arrangement pattern requiring a minimum cost. According to Patent Document 1, with the configuration described above, Map processing and Reduce processing using the processing results of the Map processing can be arranged distributively on the virtual machines which operate on the same physical machine.

Further, JP 2012-160014 A (Patent Document 2) describes a processing device including a parameter detection means for detecting parameter information of a job and storing it, a job integration means for comparing new parameter information of a newly given job with the parameter information stored by the parameter detection means, and integrating the overlapped portions of the jobs not depending on the parameters, for example. According to Patent Document 2, with the configuration described above, it is possible to execute processing by integrating the overlapped portions not depending on the parameters. Consequently, according to Patent Document 2, the processing amount can be reduced, whereby MapReduce processing can be performed at a higher speed.

Further, as a technology of dividing data and distributing it to a plurality of nodes, JP 2014-515521 A (Patent Document 3) has been known, for example. Patent Document 3 describes a distributed cloud storage system having a cloud storage broker. According to Patent Document 3, a cloud storage broker allocates data items to respective cloud storage platforms, based on a first rule to be used for subdividing data items and a second rule to be used for allocating subdivided data items to the respective cloud storage platforms. Consequently, according to Patent Document 3, it is possible to reduce vulnerability found from a platform in which data is infringed.

Patent Document 1: JP 2010-218307 A
Patent Document 2: JP 2012-160014 A
Patent Document 3: JP 2014-515521 A However, in the technologies described in Patent Documents 1 and 2, there is a case where processes having high relevance are concentrated on one node which executes processing. Consequently, there is a problem that if the one node is attacked and the processing result is leaked, the amount of leaked information is likely to be large.

Further, even in the case of using the technology of Patent Document 3, there may be a similar situation to those of Patent Documents 1 and 2. As such, even by using the technology of Patent Document 3, there is a problem that if one node is attacked and the processing result is leaked, the amount of leaked information is likely to be large, similar to the cases of Patent Documents 1 and 2.

As described above, there is a problem that when data is processed by parallel distributed processing on a plurality of nodes, there is a possibility that mutually-related information is leaked collectively.

SUMMARY

In view of the above, an exemplary object of the present invention is to provide a distributed processing control device capable of solving a problem that when data is processed by parallel distributed processing on a plurality of nodes, there is a possibility that mutually-related information is leaked collectively.

In order to achieve such an exemplary object, a distributed processing control device, which is an exemplary aspect of the present invention, adopts a configuration including a process accepting unit that accepts processes;

a relevance acquisition unit that acquires relevance between the processes accepted by the process accepting unit; and a distributed processing instruction unit that distributively instructs a plurality of processing nodes to execute the processes accepted by the process accepting unit, based on the relevance between the processes acquired by the relevance acquisition unit.

Further, a distributed processing control method, which is another exemplary aspect of the present invention, adopts a configuration including accepting processes;

acquiring relevance between the accepted processes; and based on the acquired relevance between the processes, distributively instructing a plurality of processing nodes to execute the accepted processes.

Further, a computer-readable medium storing a program, which is another exemplary aspect of the present invention, is a computer-readable medium storing a program for causing a distributed processing control device to realize:

a process accepting unit that accepts processes;

a relevance acquisition unit that acquires relevance between the processes accepted by the process accepting unit; and a distributed processing instruction unit that distributively instructs a plurality of processing nodes to execute the processes accepted by the process accepting unit, based on the relevance between the processes acquired by the relevance acquisition unit.

As the present invention is configured as described above, the present invention is able to provide a distributed processing control device which solves a problem that when data is processed by parallel distributed processing on a plurality of nodes, there is a possibility that mutually-related information is leaked collectively.

BRIEF DESCRIPTION OF THE DRAWINGS

FIG. 5 illustrates a specific example of process information in the distributed processing planning node according to the first exemplary embodiment of the present invention;

FIG. 6 illustrates exemplary information to be used when a process is divided in the distributed processing planning node according to the first exemplary embodiment of the present invention;

FIG. 7 illustrates another specific example of process information in the distributed processing planning node according to the first exemplary embodiment of the present invention;

FIG. 8 illustrates a specific example of process relevance information in the distributed processing planning node according to the first exemplary embodiment of the present invention;

FIG. 9 illustrates a specific example of process relevance information recalculated after aggregating processes in the distributed processing planning node according to the first exemplary embodiment of the present invention;

FIG. 10 illustrates exemplary information to be used when an execution plan generation unit divides a process in the distributed processing planning node according to the first exemplary embodiment of the present invention;

FIG. 11 illustrates a specific example of process relevance information recalculated after a process is divided in the distributed processing planning node according to the first exemplary embodiment of the present invention;

EXEMPLARY EMBODIMENTS

First Exemplary Embodiment

Figure 1:
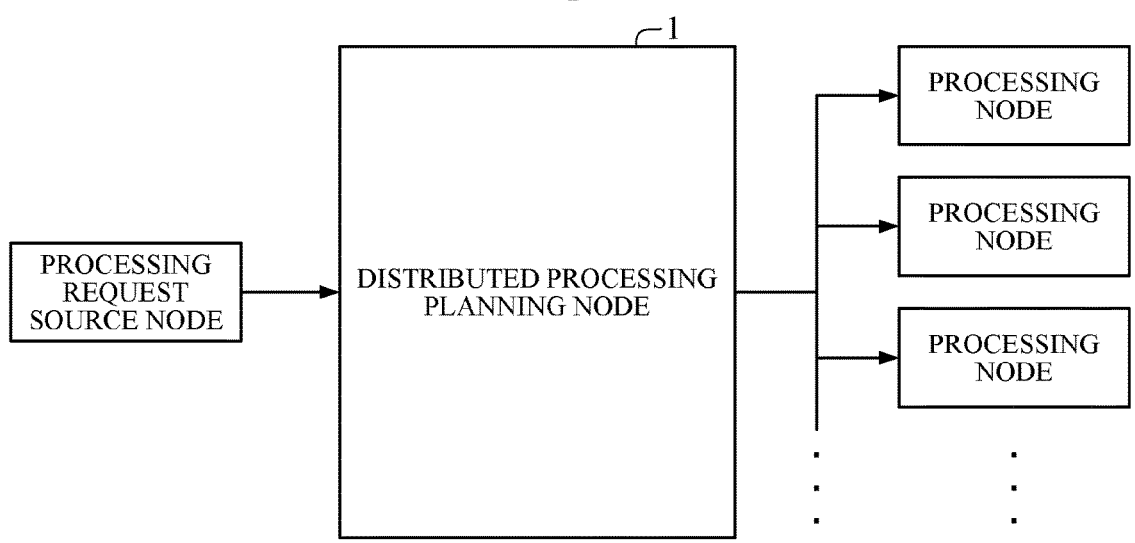
FIG. 1 is a block diagram showing an overall configuration of a distributed processing system according to a first exemplary embodiment of the present invention.
Figure 2:
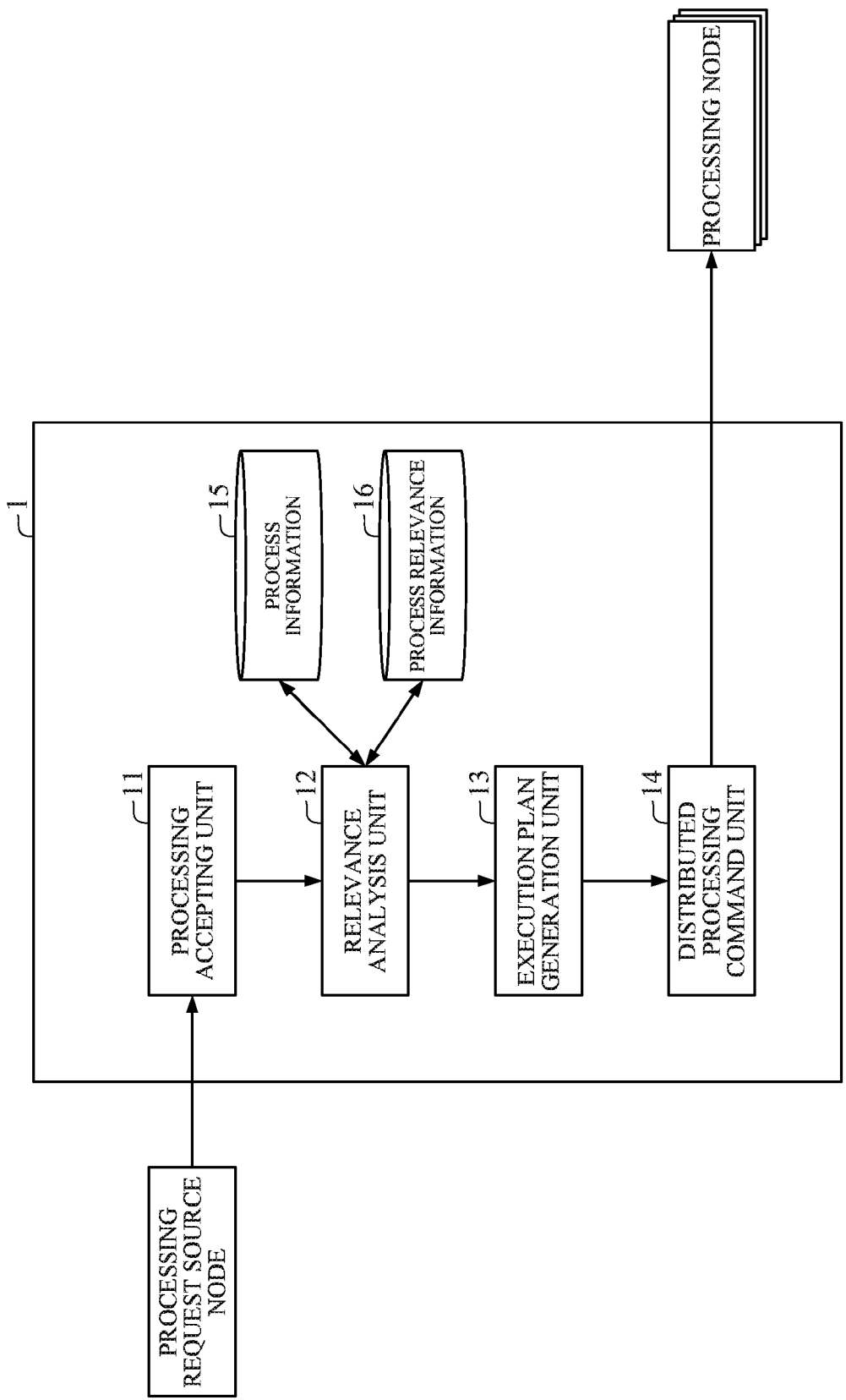
FIG. 2 is a block diagram showing a configuration of a distributed processing planning node according to the first exemplary embodiment of the present invention.
Figure 3:
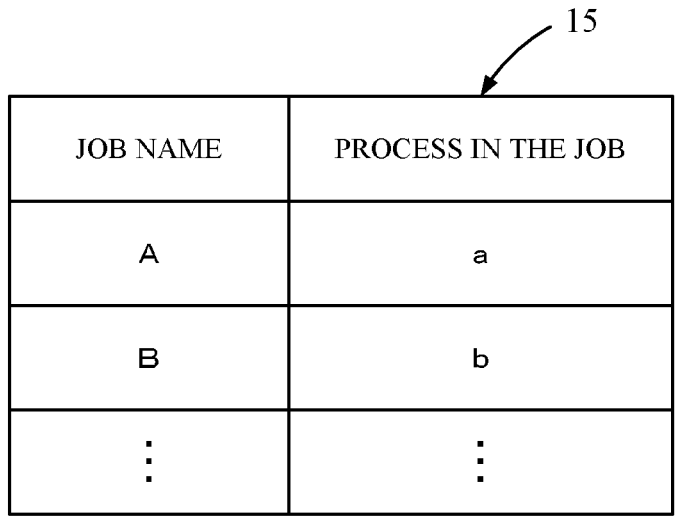
FIG. 3 illustrates an exemplary configuration of process information in a distributed processing planning node according to the first exemplary embodiment of the present invention.
Figure 4:
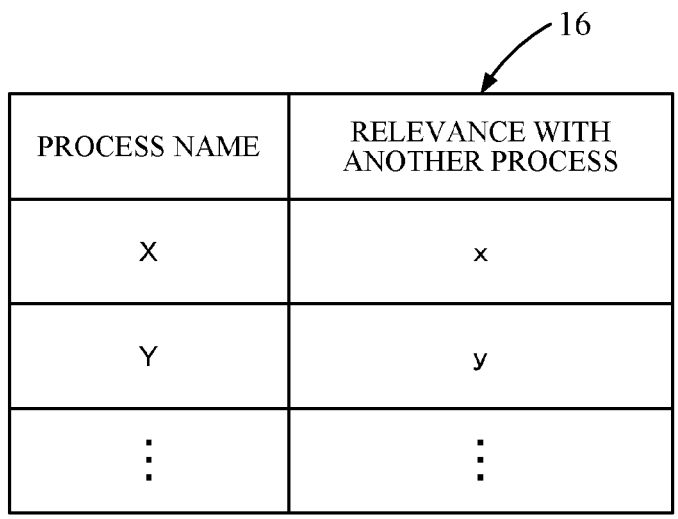
FIG. 4 illustrates an exemplary configuration of process relevance information in the distributed processing planning node according to the first exemplary embodiment of the present invention.
Figure 12:
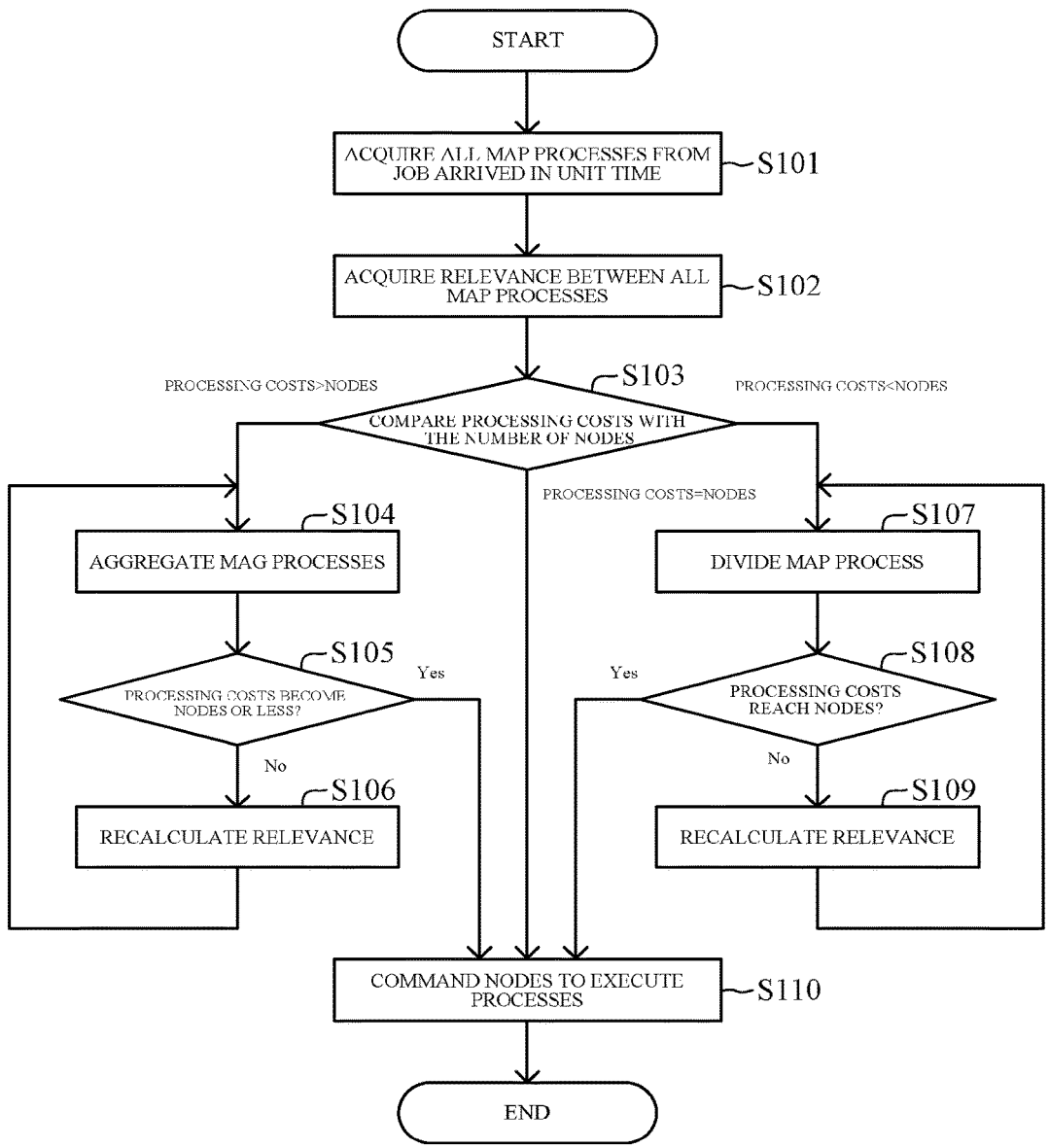
FIG. 12 is a flowchart of an exemplary operation performed by the distributed processing planning node according to the first exemplary embodiment of the present invention.

FIG. 1 is a block diagram showing an overall configuration of a distributed processing system. FIG. 2 is a block diagram showing a configuration of a distributed processing planning node 1. FIG. 3 illustrates an exemplary configuration of process information 14. FIG. 4 illustrates an exemplary configuration of process relevance information 15. FIG. 5 illustrates a specific example of the process information 14. FIG. 6 illustrates exemplary information to be used when an execution plan generation unit 13 divides a process. FIG. 7 illustrates another specific example of the process information 14. FIG. 8 illustrates a specific example of process relevance information. FIG. 9 illustrates a specific example of process relevance information 15 recalculated after the execution plan generation unit 13 aggregates processes. FIG. 10 illustrates exemplary information to be used when the execution plan generation unit 13 divides a process. FIG. 11 illustrates a specific example of the process relevance information 15 recalculated after a process is divided by the execution plan generation unit 13. FIG. 12 is a flowchart of an exemplary operation performed by the distributed processing planning node 1.

In the first exemplary embodiment of the present invention, description will be given on a distributed processing planning node 1 which distributively instructs respective processing nodes to execute processes (Map processes) requested by a processing request source node (see FIG. 1). As described below, the distributed processing planning node 1 of the present embodiment receives a series of processes (hereinafter expressed as a job) involving Map processes. Then, the distributed processing planning node 1 acquires relevance between the Map processes included in the job acquired per unit time. Then, based on the acquired relevance between the Map processes, the distributed processing planning node 1 distributively instructs the respective processing nodes to execute the Map processes received.

In the present embodiment, description will be given on the distributed processing planning node 1 configured to instruct respective processing nodes, which execute Map processes, to execute Map processes, when performing parallel distributed processing with use of MapReduce model, as described above. It should be noted that while FIG. 1 shows the case where there is single processing request source node, the distributed processing planning node 1 may be configured to acquire jobs from a plurality of processing request source nodes. Further, the number of processing nodes connected with the distributed processing planning node 1 may be any number of two or more.

Referring to FIG. 2, the distributed processing planning node 1 of the present embodiment includes a processing accepting unit 11, a relevance analysis unit 12 (relevance acquisition unit), an execution plan generation unit 13 (part of distributed processing instruction unit), a distributed processing command unit 14 (part of distributed processing instruction unit), process information 15, and process relevance information 16.

It should be noted that the distributed processing planning node 1 includes an arithmetic unit such as a CPU (Central Processing Unit) and a storage device, not shown. The distributed processing planning node 1 is adapted to realize functions of the respective units described above by executing a program stored in the storage device, for example.

The processing accepting unit 11 accepts a job from a processing request source node. Then, the processing accepting unit 11 transmits the job accepted from the processing request source node per unit time (a predetermined period of time, time may be delimited arbitrarily) to the relevance analysis unit 12.

In this way, the processing accepting unit 11 transmits the job accepted from the processing request source node to the relevance analysis unit 12 by the predetermined time. As described above, the job that the processing accepting unit 11 accepted involves a Map process. As such, when the processing accepting unit 11 accepts the job, it accepts a Map process.

When the relevance analysis unit 12 receives the job from the processing accepting unit 11, it refers to the process information 15 to thereby acquire information regarding the configuration of the processes (for example, a data acquisition process, a Map process, and the like) in the job. This means that when the relevance analysis unit 12 receives the job from the processing accepting unit 11, it refers to the process information 15 to thereby subdivide the acquired job into various types of processes such as a data acquisition process and a Map process.

Further, the relevance analysis unit 12 refers to the process relevance information 16 to thereby acquires relevance between the Map processes (processes to which distributed processing is applied) among the processes in the acquired job. Specifically, the relevance analysis unit 12 refers to the process relevance information 16 to thereby acquire relevance between a pair of Map processes acquired, respectively.

Then, the relevance analysis unit 12 transmits information showing the relevance between the pair of Map processes acquired (for example, information of a list of relevance), to the execution plan generation unit 13.

In this way, when the relevance analysis unit 12 receives a job from the processing accepting unit 11, it acquires information showing the configuration of the job to thereby subdivide the job, and acquires information regarding the Map processes. Subsequently, the relevance analysis unit 12 acquires information showing the relevance between the respective Map processes acquired. Then, the relevance analysis unit 12 transmits the information showing the relevance to the execution plan generation unit 13.

The execution plan generation unit 13 generates, based on the information showing the relevance received from the relevance analysis unit 12 and information showing resource availability of the processing nodes, an execution plan showing processing nodes caused to execute the respective Map processes included in the job accepted by the processing accepting unit 11.

For example, the execution plan generation unit 13 acquires information showing relevance between the respective pairs of Map processes from the relevance analysis unit 12. Further, the execution plan generation unit 13 monitors the processing nodes and monitors the number of processing nodes capable of executing the Map processes (having resource availability). Then, based on the information showing the relevance between the pairs and the number of processing nodes capable of executing the Map processes, the execution plan generation unit 13 generates an execution plan so as to allow a pair of Map processes having high relevance to be executed in different processing nodes.

Specifically, with respect to each Map process, the execution plan generation unit 13 calculates a processing cost representing the number of processing nodes required for executing the Map process, for example. Then, the execution plan generation unit 13 compares the number of processing nodes capable of executing the Map processes, with the processing costs. It should be noted that the processing cost varies according to the type and content of the Map process and the amount of corresponding processes.

If the processing costs equal to the number of processing nodes capable of executing the processes, the execution plan generation unit 13 generates an execution plan so as to allow the respective processing nodes to execute the respective Map processes to be executed by the respective processing nodes.

In that case, the execution plan generation unit 13 generates an execution plan such that one processing node executes one Map process.

Meanwhile, if the processing costs exceed the number of processing nodes capable of executing the processes, the execution plan generation unit 13 selects a pair of Map processes to be aggregated based on the relevance between Map processes, and aggregates the selected Map processes. For example, the execution plan generation unit 13 aggregates a pair of Map processes having the lowest relevance among those acquired by the relevance analysis unit 12. Then, the execution plan generation unit 13 generates an execution plan so as to allow the respective processing nodes to execute Map processes after aggregation.

In that case, the execution plan generation unit 13 may generate an execution plan in which a plurality of Map processes, which are aggregated, are executed by one processing node. However, as the execution plan generation unit 13 aggregates a pair having low relevance as described above, the execution plan generation unit 13 generates an execution plan so as not to concentrate Map processes having high relevance on any processing node.

It should be noted that even if the execution plan generation unit 13 aggregates a pair of Map processes, there is a case where the processing costs still exceed the number of processing nodes capable of executing the processes. In that case, the execution plan generation unit 13 is able to calculate relevance between each pair of Map processes after aggregation (relevance after aggregation), and reaggregate Map processes based on the calculated relevance after aggregation. Then, the execution plan generation unit 13 generates an execution plan so as to allow the Map processes after aggregation to be executed by the respective processing nodes. Further, in the case where the processing costs still exceed the number of processing nodes capable of executing the processes even after performing the above-described processing, the execution plan generation unit 13 repeats the above-described processing again. In this way, if the processing costs exceed the number of processing nodes capable of executing the processes, the execution plan generation unit 13 repeatedly performs aggregation of Map processes and calculation of relevance (relevance after aggregation), whereby it aggregates pairs of Map processes having low relevance to generate an executable execution plan.

Meanwhile, if the processing costs are smaller than the number of processing nodes capable of executing the processes, the execution plan generation unit 13 selects a Map process to be divided based on the relevance between the Map processes, and separates a part of the selected Map process. For example, the execution plan generation unit 13 divides a combination in which the relevance becomes the highest when combined. Then, the execution plan generation unit 13 generates an execution plan so as to allow the Map processes, after the division, to be executed by the respective processing nodes.

In that case, the execution plan generation unit 13 generates an execution plan so as to allow one processing node to execute one type of Map process or a divided Map process. As described above, the execution plan generation unit 13 divides a combination in which the relevance becomes the highest when combined. As such, the execution plan generation unit 13 generates an execution plan such that the relevance between the Map processes executed by the respective processing nodes becomes further lower.

There is also a case where the processing costs are still smaller than the number of processing nodes capable of executing the processes even after the execution plan generation unit 13 divides a pair of Map process. In that case, the execution plan generation unit 13 calculates relevance with respect to each pair of Map processes after division (relevance after division), and based on the relevance after division calculated, the execution plan generation unit 13 is able to redivide the Map process. Then, the execution plan generation unit 13 generates an execution plan so as to allow the respective processing nodes to execute the respective Map processes after the division. Further, if the processing costs are still smaller than the number of processing nodes capable of executing the processes even after the processing described above has been performed, the execution plan generation unit 13 repeats the above-described processing again. In this way, if the processing costs are smaller than the number of processing nodes capable of executing the processes, the execution plan generation unit 13 repeatedly performs division of a Map process and calculation of relevance (relevance after division), to thereby generate an execution plan such that the relevance between the Map processes executed by the respective processing nodes becomes lower.

Further, when performing aggregation and division of Map processes, the execution plan generation unit 13 is able to perform aggregation and division while considering the number of items and the data type of elements (for example, elements in the case of a Map process for tabulating males/females are male and female) constituting the Map process. For example, the execution plan generation unit 13 may be configured to, if there is a plurality of combinations in which relevance becomes the highest, divide a Map process having the largest number of elements constituting the Map process.

The distributed processing command unit 14 receives, from the execution plan generation unit 13, an execution plan generated by the execution plan generation unit 13. Then, based on the execution plan generated by the execution plan generation unit 13, the distributed processing command unit 14 commands the respective processing nodes to execute Map processes.

The distributed processing command unit 14 commands the respective nodes to execute Map processes based on the execution plan, whereby the Map processes are executed by the respective processing nodes.

The process information 15 is stored in a storage device such as a hard disk or a memory held by the distributed processing planning node 1. The process information 15 defines what kind of process is to be executed on what kind of data, as detailed information of the job. As described above, the process information 15 is to be used by the relevance analysis unit 12.

FIG. 3 illustrates an exemplary configuration of the process information 15. In the process information 15, a job name representing the type of job and processes in the job (for example, a data acquisition process, a Map process, and the like) are associated with each other. For example, on the first row of FIG. 3, a job name A is associated with a process "a" in the job. It should be noted that the types and the number of the processes, such as a data acquisition process and a Map process included in the job, vary according to the corresponding job.

The process relevance information 16 is stored in a storage device such as a hard disk or a memory held by the distributed processing planning node 1. The process relevance information 16 defines relevance between a Map process and another Map process. As described above, the process relevance information 16 is to be used by the relevance analysis unit 12.

FIG. 4 shows an exemplary configuration of the process relevance information 16. In the process relevance information 16, a process name showing the type of a Map process, and relevance with another process showing a relationship between the Map process and another Map process, are associated with each other, for example. For example, in the first row of FIG. 4, a process name X is associated with relevance x with another process. The relevance with another process includes the Map process associated with the relevance with the other process, and relevance with the other Map processes.

An exemplary configuration of the distributed processing planning node 1 is as described above. Next, exemplary processing performed by the distributed processing planning node 1 having the configuration described above will be described. For example, as exemplary processing to be performed by the distributed processing planning node 1, description will be given on the case of generating an execution plan of a job "analysis of users who purchased a product" for tabulating respective units of information with respect to data of sales details, and a job "word count" for counting appearance frequency of each word regarding a document, and instructing execution of the processing.

As shown in FIG. 2, the processing accepting unit 11 accepts the job "analysis of users who purchased a product" and the job "word count" in a unit time, from the processing request source node. Then, the processing accepting unit 11 transmits the accepted jobs to the relevance analysis unit 12.

Subsequently, the relevance analysis unit 12 refers to the process information 15 to acquire information regarding the configuration of the processes (for example, a data acquisition process, a Map process, and the like) in the jobs.

For example, in the process information 15, it is assumed that the job "analysis of users who purchased a product" is associated with the processes in the job including the following processes 1 to 5, as shown in FIG. 5.

| | (Process Name) | (Process Attribute) |
|---|---|---|
| Process 1 | Acquisition of sales detail data | Data acquisition (sales details) |
| Process 2 | Acquisition of purchaser data | Data acquisition (purchaser) |
| Process 3 | Tabulation of purchase time | Map process (purchase date) |
| Process 4 | Tabulation of generations | Map process (age of purchasers) |
| Process 5 | Tabulation of males/females | Map process (sex of purchasers) |

In this case, the relevance analysis unit 12 refers to the process information 15 to thereby acquire the processes 1 to 5. In the above processes, it is shown that the processes 1 and 2 are processes to perform data acquisition. As such, through the processes 1 and 2, input data required for Map processes as shown in FIG. 6 is generated. Further, it is shown that the processes 3, 4, and 5 are processes to perform Map processes.

Further, in the process information 15, it is assumed that the job "word count" as shown in FIG. 7 and the processes in the job including the following processes 1 and 2 are associated.

| (Process Name) | (Process Attribute) |
|---|---|
| Process 1 Acquisition of document data | Data acquisition (document) |
| Process 2 Tabulation of words | Map process (words) |

In this case, the relevance analysis unit 12 refers to the process information 15 to thereby acquire the processes 1 and 2. Further, the process 2 in the job "word count" corresponds to processing to perform a Map process.

As described above, the relevance analysis unit 12 refers to the process information 15 to thereby acquire the Map processes such as "tabulation of purchase time", "tabulation of generations", "tabulation of males/females", and "tabulation of words".

Subsequently, the relevance analysis unit 12 refers to the process relevance information 16 to thereby acquire relevance between the respective Map processes. For example, the relevance analysis unit 12 acquires relevance between the respective Map processes as shown in FIG. 8.

In the present embodiment, relevance between processes is represented as a numeral value from 0 to 1. Further, it is assumed that the relevance is higher as the numeral value is closer to 1. Further, it is also assumed that there is no relationship between the processes in the job "analysis of users who purchased a product" and the processes in the job "word count" job (as a value which is close to 0 as much as possible, it is defined as 0.01, for example).

Referring to FIG. 8, as relevance between Map processes of the same type such as "tabulation of purchase time" and "tabulation of purchase time", the relevance analysis unit 12 acquires relevance "1" indicating very high relevance. Further, as relevance between "tabulation of purchase time" and "tabulation of generations", the relevance analysis unit 12 acquires relevance "0.5", for example. In this way, the relevance analysis unit 12 acquires relevance between Map processes.

It should be noted that as relevance between "tabulation of males/females" and "tabulation of generations", the relevance analysis unit 12 acquires relevance "0.7", for example (see FIG. 8). In this way, the relevance analysis unit 12 acquires relevance given for a pair of Map processes (different pairs of Map processes may have the same relevance value). Further, the relevance analysis unit 12 acquires relevance "0.01", indicating extremely low relevance, between each of "tabulation of purchase time", "tabulation of generations", and "tabulation of males/females", and "tabulation of words", as described above.

Then, the relevance analysis unit 12 transmits the acquired information showing the relevance (information of a list of relevance, for example), to the execution plan generation unit 13.

Based on the acquired information showing the relevance between the respective Map processes, information showing the processing nodes and the resource availability, and the processing costs of the respective Map processes, the execution plan generation unit 13 generates an execution plan.

The execution plan generation unit 13 calculates the processing costs of the respective Map processes acquired, and compares the processing costs with the resource availability of the respective processing nodes.

For example, the execution plan generation unit 13 calculates respective processing costs such that each of the three processes of sales details requires a processing cost of 10 nodes, and the word appearance frequency counting process requires a processing cost of 5 nodes. As such, as the processing costs required for executing the respective Map processes, the execution plan generation unit 13 calculates the processing costs as shown below.

| | |
|---|---|
| Tabulation of words | 5 nodes |
| Tabulation of purchase time | 10 nodes |
| Tabulation of generations | 10 nodes |
| Tabulation of males/females | 10 nodes |

Then, the execution plan generation unit 13 compares the calculated processing costs with the number of processing nodes capable of executing the Map processes.

For example, when the number of processing nodes capable of executing the processes is 35 nodes, the processing costs and the number of processing nodes capable of executing the processes are equal. As such, the execution plan generation unit 13 generates an execution plan so as to allow the respective processing nodes to execute the respective Map processes.

Meanwhile, if the number of the processing nodes capable of executing the processes is less than 35 nodes such as 30 nodes, the processing costs are larger than the number of processing nodes capable of executing the processes. As such, the execution plan generation unit 13 aggregates "tabulation of purchase time" and "tabulation of words" which are a pair of Map processes having the lowest relevance. Consequently, Map processes for which the execution plan generation unit 13 generates an execution plan include "tabulation of purchase time", "tabulation of generations", "tabulation of males/females", and "tabulation of purchase time+words". Further, the processing costs become as shown below, for example.

| | |
|---|---|
| Tabulation of words | 5→0 node |
| Tabulation of purchase time | 10→5 nodes |
| Tabulation of generations | 10 nodes |
| Tabulation of males/females | 10 nodes |
| Tabulation of purchase time + words | 0→5 nodes |

Through the above-described processing, if the number of processing nodes capable of executing the processes equals to the processing costs (in this case, if the number of processing nodes capable of executing the processes is 30 nodes), the execution plan generation unit 13 generates an execution plan so as to allow the respective Map processes to be executed by the respective processing nodes.

If the number of processing nodes capable of executing the processes is 29 nodes or less, even though aggregation is performed as described above, the processing costs still exceed the number of processing nodes capable of executing the processes. As such, the execution plan generation unit 13 calculates relevance (relevance after aggregation) with respect to each pair of Map processes after the aggregation. For example, the execution plan generation unit 13 calculates relevance with respect to each pair of Map processes after the aggregation by adding the relevance between the aggregated Map processes.

Specifically, as shown in FIG. 9, the execution plan generation unit 13 calculates relevance between "tabulation of purchase time+words", which is an aggregated process, and "tabulation of generations" to be 0.51. This value is obtained by adding the relevance "0.5" between "tabulation of generations" and "tabulation of purchase time" and the relevance "0.01" between "tabulation of generations" and "tabulation of words". In this way, when processes are aggregated, the execution plan generation unit 13 calculates the relevance according to the aggregated process. As a result of calculation, if the relevance becomes "1" or larger, the execution plan generation unit 13 calculates the relevance to be 1 (relevance is 1 or less).

Then, based on the calculated relevance, the execution plan generation unit 13 reaggregates a pair of Map processes having the lowest relevance. For example, the execution plan generation unit 13 aggregates "tabulation of purchase time" and "tabulation of generations". Then, if the number of processing nodes capable of executing the processes becomes equal to the processing costs through the aggregation, the execution plan generation unit 13 generates an execution plan so as to allow the respective Map processes to be executed by the respective processing nodes. On the other hand, if the processing costs are still larger than the the number of processing nodes capable of executing the processes even after the aggregation has been performed, the execution plan generation unit 13 performs calculation of relevance with respect to each pair of Map processes after the aggregation, and reaggregates Map processes based on the calculated relevance. In this way, when the processing costs are larger than the number of processing nodes capable of executing the processes, the execution plan generation unit 13 repeatedly performs aggregation of Map processes and calculation of relevance. Thereby, the execution plan generation unit 13 generates an execution plan such that relevance between the respective Map processes executed by the respective processing nodes becomes lower.

Further, if the number of processing nodes capable of executing the processes is 40 nodes, for example, which is larger than the processing costs, that is, 35 nodes, it means that there are extra processing nodes for executing processes simultaneously. As such, the execution plan generation unit 13 divides "tabulation of generations" having the highest relevance when combined, for example (a combination of "tabulation of generations" has relevance 1 which is the highest relevance). Consequently, Map processes for which the execution plan generation unit 13 generates an execution plan include "tabulation of purchase time", "tabulation of generations (~ teens, twenties, thirties)", "tabulation of generations (forties, fifties, sixties ~)", and "tabulation of males/females". The processing costs thereof are as shown below.

| Tabulation of words | 5 nodes |
| Tabulation of purchase time | 10 nodes |
| Tabulation of generations | 10→ 20 nodes |
| Tabulation of males/females | 10 nodes |

Determination of division as described above can be made by the execution plan generation unit 13 by referring to each-Map process division information as shown in FIG. 10 acquired from a storage device not shown. This means that the execution plan generation unit 13 is able to perform division while considering the number of items and the data type of the elements constituting each Map process. Referring to FIG. 10, between "tabulation of purchase time", between "tabulation of generations", and between "tabulation of males/females" in which relevance becomes the highest when combined, a Map process of "tabulation of generations" is configured of the largest number of elements. As such, the execution plan generation unit 13 determines to divide the Map process of "tabulation of generations".

Through the processing described above, if the number of processing nodes capable of executing the processes becomes equal to the processing costs (in this case, if the number of processing nodes capable of executing the processes is 45 nodes), the execution plan generation unit 13 generates an execution plan so as to allow the respective Map processes to be executed by the respective processing nodes.

Meanwhile, if the number of processing nodes capable of executing the processes is larger than 46 nodes, the processing costs are still smaller than the number of processing nodes capable of executing the processes even after the division has been performed. As such, the execution plan generation unit 13 calculates relevance (relevance after division) with respect to each pair of Map processes after the division. For example, the execution plan generation unit 13 calculates relevance with respect to each pair of Map processes after the division by subtracting relevance between the divided Map process and another Map process. It should be noted that a value to be subtracted may be adjusted variously.

Specifically, as shown in FIG. 11, the execution plan generation unit 13 calculates relevance between "tabulation of generations (~ teens, twenties, thirties)" and "tabulation of purchase time" to be 0.4. In this way, when the execution plan generation unit 13 divides a process, it calculates relevance according to the divided processes.

Then, the execution plan generation unit 13 redivides a pair of Map processes having the highest relevance when combined. For example, the execution plan generation unit 13 divides "tabulation of males/females". Then, if the number of processing nodes capable of executing the processes becomes equal to the processing costs through the division, the execution plan generation unit 13 generates an execution plan so as to allow the respective Map processes to be processed by the respective processing nodes. Meanwhile, if the processing costs are still smaller than the number of processing node capable of executing the processes even after the division has been performed, the execution plan generation unit 13 performs calculation of relevance with respect to each pair of Map processes after the division, and redivides Map processes based on the calculated relevance. In this way, if the processing costs are smaller than the number of processing nodes capable of executing the processes, the execution plan generation unit 13 repeatedly performs division of Map processes and calculation of relevance. Thereby, the execution plan generation unit 13 generates an executable execution plan by dividing Map processes having high relevance.

Exemplary processing performed by the distributed processing planning node 1 is as described above. Next, an exemplary operation of the distributed processing planning node 1 will be described with reference to the flowchart of FIG. 12.

Referring to FIG. 12, the processing accepting unit 11 of the distributed processing planning node 1 accepts a job. Then, the relevance analysis unit 12 refers to the process information 15 and acquires Map processes corresponding to the job, with reference to every job accepted by processing accepting unit 11 in a unit time (step S101).

Subsequently, the relevance analysis unit 12 refers to the process relevance information 16 to thereby acquire relevance between the acquired Map processes (step S102). Then, the relevance analysis unit 12 transmits the acquired relevance to the execution plan generation unit 13.

The execution plan generation unit 13 calculates a processing cost of each Map process. Further, the execution plan generation unit 13 monitors processing nodes, and acquires the number of processing nodes having resource availability and capable of executing the Map processes. Then, the execution plan generation unit 13 compares the calculated processing costs and the number of processing nodes capable of executing the Map processes (step S103).

Then, if the processing costs equal to the number of processing nodes capable of executing the Map processes (step S103, processing costs=nodes), the execution plan generation unit 13 generates an execution plan so as to allow the respective processing nodes to execute the respective Map processes. Then, the distributed processing command unit 14 uses the execution plan generated by the execution plan generation unit 13 to command the respective processing nodes to execute the Map processes (step S110).

Meanwhile, if the processing costs are larger than the number of processing nodes capable of executing the processes (step S103, processing cost>node), the execution plan generation unit 13 aggregates part of Map processes based on the relevance between pairs of Map processes (step S104). For example, the execution plan generation unit 13 aggregates a pair of Map processes having the lowest relevance.

Then, the execution plan generation unit 13 compares the processing costs of the Map processes after the aggregation with the number of processing nodes capable of executing the processes (step S105).

As a result of aggregating the Map processes, if the processing costs become not more than the number of processing nodes capable of executing the processes (step S105, Yes), the execution plan generation unit 13 generates an execution plan so as to allow the respective processing nodes to execute the respective Map processes. Then, the distributed processing command unit 14 uses the execution plan, generated by the execution plan generation unit 13, to command the respective processing nodes to execute the Map processes (step S110).

On the other hand, as a result of aggregating the Map processes, if the processing costs do not become not more than the number of processing nodes capable of executing the processes (step S105, No), the execution plan generation unit 13 calculates relevance between the Map processes after the aggregation (step S106). Then, the execution plan generation unit 13 uses the calculated relevance to reaggregate Map processes (step S104).

Meanwhile, if the processing costs are smaller than the number of processing nodes capable of executing the processes (step S103, processing cost<node), the execution plan generation unit 13 divides part of Map processes based on the relevance between the pairs of Map processes (step S107). For example, the execution plan generation unit 13 divides a Map process having the highest relevance when combined.

Then, the execution plan generation unit 13 compares the processing costs of the Map processes after the division with the number of processing nodes capable of executing the processes (step S108).

As a result of dividing a Map process, if the processing costs become the number of processing nodes capable of executing processes (step S108, Yes), the execution plan generation unit 13 generates an execution plan so as to allow the respective processing nodes to execute the respective Map processes. Then, the distributed processing command unit 14 uses the execution plan, generated by the execution plan generation unit 13, to command the respective processing nodes to execute the Map processes (step S110).

On the other hand, as a result of dividing the Map process, if the processing costs do not become the number of processing nodes capable of executing the processes (step S108, No), the execution plan generation unit 13 calculates the relevance between the Map processes after the division (step S109). Then, the execution plan generation unit 13 uses the calculated relevance to redivide a Map process (step S107).

In this way, the distributed processing planning node 1 of the present embodiment includes the relevance analysis unit 12 and the execution plan generation unit 13. With this configuration, the relevance analysis unit 12 of the distributed processing planning node 1 is able to acquire relevance between the Map processes according to the acquired job. Further, based on the relevance acquired by the relevance analysis unit 12, the execution plan generation unit 13 is able to generate an execution plan so as to prevent the Map processes having high relevance from being concentrated on a part of processing nodes (so as to allow the Map processes having high relevance to be executed by difference processing nodes). Consequently, the distributed processing planning node 1 is able to prevent Map processes having high relevance from being concentrated on each processing node executing Map processes. As such, even if a node is attacked and a processing result is leaked, it is possible to prevent mutually-related information from being leaked collectively.

It should be noted that in the present embodiment, it has been described that if the processing costs are smaller than the number of processing nodes capable of executing the processes, the execution plan generation unit 13 divides a part of Map processes. However, the execution plan generation unit 13 may be configured to generate an execution plan without dividing a Map process when the processing costs are smaller than the number of processing nodes capable of executing the processes.

Further, in the present embodiment, it has been described that Map processes of the same type have high relevance (relevance is "1"). However, there is a case where Map processes of the same type have low relevance, depending on the nature of the processes. As such, a configuration in which Map processes of the same type has low relevance is acceptable, depending on the type thereof.

Further, the execution plan generation unit 13 may be configured to calculate patterns of aggregation and division and relevance predicted therefrom in advance, and based on the calculation result, determine how to perform aggregation or division.

Further, if there are a plurality of candidates for Map processes for aggregation or division of Map processes, the execution plan generation unit 13 is able to specify Map processes to be aggregated or divided by using various methods. As described above, the execution plan generation unit 13 is able to perform aggregation or division while considering the number of items or the data types of the elements constituting the Map processes. Further, the execution plan generation unit 13 may select a combination of Map processes to be aggregated at random from the candidates, for example. In this way, the present invention can be carried out without depending on a method to be used by the execution plan generation unit 13 for specifying Map processes to be aggregated or divided from a plurality of candidates.

Further, while description has been given on the case of performing parallel distributed processing by using MapReduce model in the present embodiment, application of the present invention is not limited to the case of using MapReduce model. The present invention is also applicable to the case of performing parallel distributed processing, other than the case of using MapReduce model.

Second Exemplary Embodiment

A second exemplary embodiment of the present invention describes a distributed processing planning node 2 which distributively instructs respective processing nodes to execute processes (Map processes) requested from a processing request source node. As described below, the distributed processing planning node 2 of the present embodiment performs distributed instruction on the respective processing nodes while taking into account the reliability of the respective processing nodes.

Figure 13:
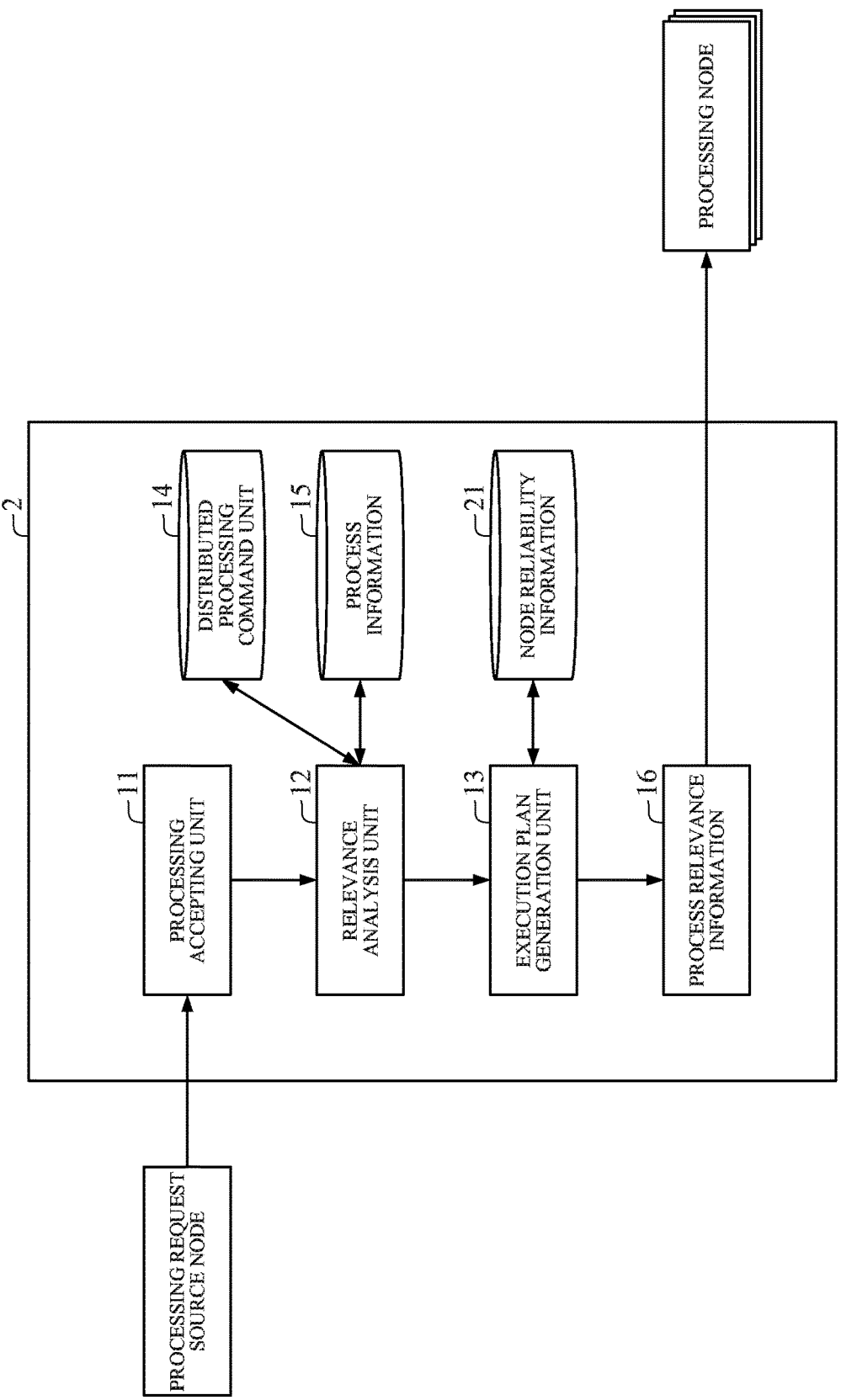
FIG. 13 is a block diagram showing a configuration of a distributed processing planning node according to a second exemplary embodiment of the present invention.

Referring to FIG. 13, the distributed processing planning node 2 of the present embodiment has an almost similar configuration to that of the distributed processing planning node 1 described in the first exemplary embodiment. That is, the distributed processing planning node 2 includes the processing accepting unit 11, the relevance analysis unit 12, the execution plan generation unit 13, the distributed processing command unit 14, the process information 15, and the process relevance information 16. The distributed processing planning node 2 of the present embodiment further includes node reliability information 21.

As described above, the distributed processing planning node 2 of the present embodiment has an almost similar configuration to that of the distributed processing planning node 1 described in the first exemplary embodiment. In the present embodiment, description of the contents overlapping the description of the first exemplary embodiment is omitted. As such, hereinafter, description will be given on a configuration particular to the present embodiment.

The node reliability information 21 is stored in a storage device such as a hard disk or a memory held by the distributed processing planning node 2. The node reliability information 21 defines the reliability of each processing node, showing a possibility that information leakage or falsification is made in each processing node. The node reliability information 21 is used by the execution plan generation unit 13, for example.

Based on the information showing the relevance received from the relevance analysis unit 12, information showing the resource availability of the respective processing nodes, and the node reliability information 21, the execution plan generation unit 13 generates an execution plan showing which Map process, included in a job accepted by the processing accepting unit 11, is to be executed by which processing node.

For example, the execution plan generation unit 13 generates an execution plan so as to prevent an aggregated Map process from being executed by a processing node having low reliability. In this way, the execution plan generation unit 13 generates an execution plan by combining the reliability of the respective processing nodes and the relevance. It should be noted that the execution plan generation unit 13 may generate an execution plan by a method other than that exemplary shown above.

As described above, the distributed processing planning node 2 of the present embodiment includes the node reliability information 21. With this configuration, the execution plan generation unit 13 is able to generate an execution plan while taking into account the reliability of the respective processing nodes. Consequently, it is possible to further reduce a possibility that information having high relevance is leaked at a time.

It should be noted that in addition to the above-described configuration, the distributed processing planning node 2 may be configured to generate an execution plan by further taking into account the importance of information handled in the respective Map processes.

Further, the distributed processing planning node 2 may involve changes similar to those of the distributed processing planning node 1 described in the first exemplary embodiment.

Third Exemplary Embodiment

A third exemplary embodiment of the present invention describes a distributed processing control device 3 which accepts processing and performs distributed instruction regarding the accepted processing. In the present embodiment, a schematic configuration of the distributed processing control device 3 will be described.

Figure 14:
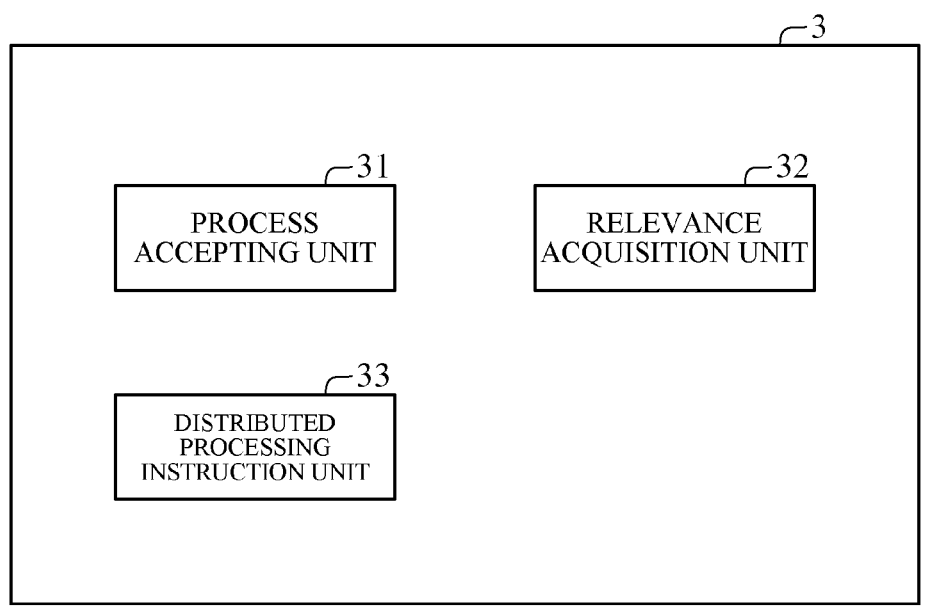
FIG. 14 is a schematic block diagram showing an exemplary configuration of a distributed processing control device according to a third exemplary embodiment of the present invention.

Referring to FIG. 14, the distributed processing control device 3 includes a process accepting unit 31, a relevance acquisition unit 32, and a distributed processing instruction unit 33.

The process accepting unit 31 accepts processes. Further, the relevance acquisition unit 32 acquires relevance between the processes accepted by the processing accepting unit 31. Based on the relevance between the processes acquired by the relevance acquisition unit 32, the distributed processing instruction unit 33 distributively instructs a plurality of processing nodes to execute the processes accepted by the process accepting unit 31.

As described above, the distributed processing control device 3 of the present embodiment includes the process accepting unit 31, the relevance acquisition unit 32, and the distributed processing instruction unit 33. With this configuration, the relevance acquisition unit 32 is able to acquire relevance between the processes accepted by the process accepting unit 31. Further, based on the relevance acquired by the relevance acquisition unit 32, the distributed processing instruction unit 33 is able to perform distributed instruction on the processing nodes. Consequently, processes according to the relevance (for example, processes having low relevance) are transmitted to respective processing nodes. Thereby, the distributed processing control device 3 is able to prevent processes having high relevance from being concentrated on each processing node. Thereby, even if a node is attacked and a processing result is leaked, it is possible to prevent mutually-related information from leaked collectively.

Further, the distributed processing control device 3 described above is realized by incorporating a predetermined program in the distributed processing control device 3. Specifically, a program which is another aspect of the present invention is a program for causing a distributed processing control device to realize a process accepting unit that accepts processes, a relevance acquisition unit that acquires relevance between the processes accepted by the process accepting unit, and a distributed processing instruction unit that distributively instructs a plurality of processing nodes to execute the processes accepted by the process accepting unit, based on the relevance between the processes acquired by the relevance acquisition means.

Further, a distributed processing control method performed by operation of the distributed processing control device 3 is a method including accepting processes; acquiring relevance between the accepted processes; and based on the acquired relevance between the processes, distributively instructing a plurality of processing nodes to execute the accepted processes.

As a program or a distributed processing control method, having the above described configuration, has a similar action to that of the distributed processing control device 3, the exemplary object of the present invention can be achieved.

<Supplementary Notes>

The whole or part of the exemplary embodiments disclosed above can be described as, but not limited to, the following supplementary notes. Hereinafter, the outline of the configuration of a distributed processing control device and the like according to the present invention will be described. However, the present invention is not limited to the configurations described below.

(Supplementary Note 1)

A distributed processing control device comprising:

a process accepting unit that accepts a process;

a relevance acquisition unit that acquires relevance between the processes accepted by the process accepting unit; and a distributed processing instruction unit that distributively instructs a plurality of processing nodes to execute the processes accepted by the process accepting unit, based on the relevance between the processes acquired by the relevance acquisition unit.

(Supplementary Note 2)

The distributed processing control device according to supplementary note 1, wherein when the distributed processing instruction unit distributively instructs the processing nodes to execute the processes, in a case of instructing any of the processing nodes to execute a plurality of the processes, the distributed processing instruction unit instructs the processing node to execute a process in which the processes, selected based on the relevance, are aggregated.

(Supplementary Note 3)

The distributed processing control device according to supplementary note 1 or 2, wherein if the number of processing nodes required for executing the processes, accepted by the process accepting unit, is larger than the number of processing nodes capable of executing the processes, the distributed processing instruction unit aggregates a plurality of the processes selected based on the relevance, and distributively instructs the processing nodes to execute the processes including the aggregated process.

(Supplementary Note 4)

The distributed processing control device according to supplementary note 3, wherein the distributed processing instruction unit calculates relevance after aggregation which is relevance between the processes including the aggregated process, and based on the calculated relevance after aggregation, reaggregates a plurality of processes selected from the processes including the aggregated process, and distributively instructs the processing nodes to execute the processes including the reaggregated process.

(Supplementary Note 5)

The distributed processing control device according to any of supplementary notes 1 to 4, wherein if the number of processing nodes required for executing the processes accepted by the process accepting unit is smaller than the number of processing nodes capable of executing the processes, the distributed processing instruction unit divides a part of the processes selected based on the relevance, and distributively instructs the processing nodes to execute the processes including the divided processes.

(Supplementary Note 6)

The distributed processing control device according to supplementary note 5, wherein the distributed processing instruction unit calculates relevance after division which is relevance between the processes including the divided processes, and based on the calculated relevance after division, redivides a part of the processes selected from the processes including the divided processes, and distributively instructs the processing nodes to execute the processes including the redivided processes.

(Supplementary Note 7)

The distributed processing control device according to any of supplementary notes 1 to 6, wherein the distributed processing instruction unit acquires reliability information showing reliability of each of the processing nodes, and based on the relevance and the reliability information, distributively instructs the processing nodes to execute the processes accepted by the process accepting unit.

(Supplementary Note 8)

The distributed processing control device according to any of supplementary notes 1 to 7, wherein the process accepting unit accepts a job which is a series of processes involving a Map process, generating a pair of a key and a value, to thereby accept the Map process included in the accepted job, the relevance acquisition unit calculates relevance between the Map processes included in the job accepted per unit time by the process accepting unit, and the distributed processing instruction unit distributively instructs a plurality of processing nodes to execute the Map processes based on the relevance between the Map processes.

(Supplementary Note 9)

A distributed processing control method comprising:

accepting a process;

acquiring relevance between the accepted processes; and based on the acquired relevance between the processes, distributively instructing a plurality of processing nodes to execute the accepted processes.

(Supplementary Note 9-1)

The distributed processing control method according to supplementary note 9, wherein the distributively instructing the processing nodes to execute the processes includes, in a case of instructing any of the processing nodes to execute a plurality of the processes, instructing the processing node to execute a process in which the processes, selected based on the relevance, are aggregated.

(Supplementary Note 9-2)

The distributed processing control method according to supplementary note 9 or 9-1, further comprising if the number of processing nodes required for executing the processes is larger than the number of processing nodes capable of executing the processes, aggregating a plurality of the processes selected based on the relevance, and distributively instructing the processing nodes to execute the processes including the aggregated process.

(Supplementary Note 10)

A non-transitory computer-readable medium storing a program comprising instructions for causing a distributed processing control device to realize:

a process accepting unit that accepts a process;

a relevance acquisition unit that acquires relevance between the processes accepted by the process accepting unit; and a distributed processing instruction unit that distributively instructs a plurality of processing nodes to execute the processes accepted by the process accepting unit, based on the relevance between the processes acquired by the relevance acquisition unit.

(Supplementary Note 10-1)

The non-transitory computer-readable medium storing the program according to supplementary note 10, wherein when the distributed processing instruction unit distributively instructs the processing nodes to execute the processes, in a case of instructing any of the processing nodes to execute a plurality of the processes, the distributed processing instruction unit instructs the processing node to execute a process in which the processes, selected based on the relevance, are aggregated.

(Supplementary Note 10-2)

The non-transitory computer-readable medium storing the program according to supplementary note 10 or 10-1, wherein if the number of processing nodes required for executing the processes, accepted by the process accepting unit, is larger than the number of processing nodes capable of executing the processes, the distributed processing instruction unit aggregates a plurality of the processes selected based on the relevance, and distributively instructs the processing nodes to execute the processes including the aggregated process.

It should be noted that the program described in the respective embodiments and supplementary notes may be stored in a storage device, or on a computer-readable storing medium. For example, a storing medium is a portable medium such as a flexible disk, an optical disk, a magneto-optical disk, a semiconductor memory, or the like.

While the present invention has been described with reference to the exemplary embodiments described above, the present invention is not limited to the above-described embodiments. The form and details of the present invention can be changed within the scope of the present invention in various manners that can be understood by those skilled in the art.

The invention claimed is:

1. A distributed processing control device comprising:
a storage device in which, in a case of performing distributed processing using a MapReduce model in which a Map process for data processing and a Reduce process that uses a process result of the Map process are performed, process relevance information showing relevance between a Map process and another Map process is stored for each of a pair of Map processes, the relevance being a predetermined value and taking a higher value as the Map process and the other Map process have higher relevance to each other; and
a processor that executes instructions to:
accept a plurality of the Map processes;
acquire the relevance between each pair of Map processes included in the plurality of the Map processes accepted, with reference to the process relevance information stored in the storage device; and
distributively instruct a plurality of processing nodes to execute the accepted Map processes so that different processing nodes execute Map processes having high relevance, based on the acquired relevance between the pair of Map processes, wherein
the processor performs the distributed instruction based on the acquired relevance between the pair of Map processes so that the different processing nodes execute processes in which a value of the relevance becomes high among processes to be executed, by aggregating a pair of Map processes having lowest relevance among the processes to be executed or dividing a combination in which the relevance becomes highest when combined among the processes to be executed, based on a result of calculating a processing cost required for executing the Map processes and the number of processing nodes capable of executing the Map processes.

2. The distributed processing control device according to claim 1, wherein
when the processor distributively instructs the processing nodes to execute the Map processes, in a case of instructing any of the processing nodes to execute a plurality of the Map processes, the processor instructs the processing node to execute a Map process in which the Map processes, selected based on the relevance, are aggregated.

3. The distributed processing control device according to claim 1, wherein
if the number of processing nodes required for executing the accepted Map processes is larger than the number of processing nodes capable of executing the Map processes, the processor aggregates a plurality of the Map processes selected based on the relevance, and distributively instructs the processing nodes to execute the Map processes including the aggregated Map process.

4. The distributed processing control device according to claim 3, wherein
the processor calculates relevance after aggregation which is relevance between the Map processes including the aggregated Map process, and based on the calculated relevance after aggregation, reaggregates a plurality of Map processes selected from the Map processes including the aggregated Map process, and distributively instructs the processing nodes to execute the Map processes including the reaggregated Map process.

5. The distributed processing control device according to claim 1, wherein
if the number of processing nodes required for executing the accepted Map process is smaller than the number of processing nodes capable of executing the Map processes, the processor divides a part of the Map processes selected based on the relevance, and distributively instructs the processing nodes to execute the Map processes including the divided Map processes.

6. The distributed processing control device according to claim 5, wherein
the processor calculates relevance after division which is relevance between the Map processes including the divided Map processes, and based on the calculated relevance after division, redivides a part of the Map processes selected from the Map processes including the divided Map processes, and distributively instructs the processing nodes to execute the Map processes including the redivided Map processes.

7. The distributed processing control device according to claim 1, wherein
the processor acquires reliability information showing reliability of each of the processing nodes, and based on the relevance and the reliability information, distributively instructs the processing nodes to execute the accepted Map processes.

8. The distributed processing control device according to claim 1, wherein
the processor accepts a job which is a series of Map processes involving a Map process, generating a pair of a key and a value, to thereby accept the Map process included in the accepted job, the processor calculates relevance between the Map processes included in the accepted job per unit time, and the processor distributively instructs a plurality of processing nodes to execute the Map processes based on the relevance between the Map processes.

9. A distributed processing control method comprising:

storing, by a storage device, in a case of performing distributed processing using a MapReduce model in which a Map process for data processing and a Reduce process that uses a process result of the Map process are performed, process relevance information showing relevance between a Map process and another Map process for each of a pair of Map processes, the relevance being a predetermined value and taking a higher value as the Map process and the other Map process having higher relevance to each other;

accepting, by a processor of a computing device, a plurality of Map processes;

acquiring, by the processor, the relevance between each pair of Map processes included in the plurality of the Map processes accepted, with reference to the process relevance information stored in the storage device; and based on the acquired relevance between the processes, distributively instructing, by the processor, a plurality of processing nodes to execute the accepted Map processes so that different processing nodes execute Map processes having high relevance, based on the acquired relevance between the pair of Map processes, wherein the processor performs the distributed instruction based on the acquired relevance between the pair of Map processes so that the different processing nodes execute processes in which a value of the relevance becomes high among processes to be executed, by aggregating a pair of Map processes having lowest relevance among the processes to be executed or dividing a combination in which the relevance becomes highest when combined among the processes to be executed, based on a result of calculating a processing cost required for executing the Map processes and the number of processing nodes capable of executing the Map processes.

10. A non-transitory computer-readable medium storing a program comprising instructions for causing a distributed processing control device to perform a method comprising:

storing, in a case of performing distributed processing using a MapReduce model in which a Map process for data processing and a Reduce process that uses a process result of the Map process are performed, process relevance information showing relevance between a Map process and another process for each of a pair of Map processes, the relevance being a predetermined value and taking a higher value as the Map process and the other Map process having higher relevance to each other;

accepting a plurality of Map processes;

acquiring relevance between each pair of Map processes included in the plurality of the Map processes accepted, with reference to the process relevance information stored in the storage device; and distributively instruct a plurality of processing nodes to execute the accepted Map processes so that different processing nodes execute Map processes having high relevance, based on the acquired relevance between the pair of Map processes, wherein the processor performs the distributed instruction based on the acquired relevance between the pair of Map processes so that the different processing nodes execute processes in which a value of the relevance becomes high among processes to be executed, by aggregating a pair of Map processes having lowest relevance among the processes to be executed or dividing a combination in which the relevance becomes highest when combined among the processes to be executed, based on a result of calculating a processing cost required for executing the Map processes and the number of processing nodes capable of executing the Map processes.

* * * * *